United States Patent [19]
Dellaverson

[11] Patent Number: 5,867,492
[45] Date of Patent: Feb. 2, 1999

[54] RADIO UNIT AND METHOD OF COMMUNICATING BETWEEN RADIO UNITS OVER A COMMUNICATIONS CHANNEL

[75] Inventor: Louis P. Dellaverson, Bamington, Ill.

[73] Assignee: Motorola, Inc., Schaumburg, Ill.

[21] Appl. No.: 723,658

[22] Filed: Oct. 3, 1996

[51] Int. Cl.$^6$ .......................................... H04J 3/24
[52] U.S. Cl. ..................... 370/349; 370/381; 370/395; 370/345
[58] Field of Search ...................... 370/345, 347, 370/349, 378, 379, 381, 382, 383, 395, 389, 397, 442

[56] References Cited

U.S. PATENT DOCUMENTS

| | | | |
|---|---|---|---|
| 4,491,947 | 1/1985 | Frank | 370/349 |
| 5,065,398 | 11/1991 | Takashima | 370/349 |
| 5,684,791 | 11/1997 | Raychaudhuri et al. | 370/349 |

*Primary Examiner*—Alpus H. Hsu
*Assistant Examiner*—Steven Nguyen
*Attorney, Agent, or Firm*—J. Ray Wood

[57] ABSTRACT

A method of communicating between radio units (10, 11, 12, 13) by transferring cells over a communication channel having repeating frames. A matrix (200) of frame positions is maintained, where a first dimension (X) of the matrix corresponds to positions in a frame and a second dimension (Y) corresponds to frames in a sequence of frames. A value (P) is associating with each frame position, representative of a minimum repeat number. A cell is allocated to a position in a frame and the cell allocation is repeated every Nth frame where N is an integer multiple of the repeat number (P). In another embodiment, a cell is transmitted at the selected position in the frame and an indicator is included in the transmitted cell, where the indicator represents an integer value N. Subsequent cells are transmitted at the selected position every Nth frame.

6 Claims, 5 Drawing Sheets

FIG.1

LISTENING TIME
OF .1 SEC EQUALS
A MINIMUM USE
BANDWIDTH OF 4240 BPS 12.28μs

RADIO UNIT AND METHOD OF COMMUNICATING BETWEEN RADIO UNITS OVER A COMMUNICATIONS CHANNEL

FIELD OF THE INVENTION

This invention relates to a method of communication in a wireless communications system and it relates to a radio unit for operation in such a system.

BACKGROUND OF THE INVENTION

Asynchronous transfer mode (ATM) is a mode of fast packet switching which allows systems to operate at a much higher rate than traditional packet switching systems. Features which characterizes ATM communications are: the ability for asynchronous operations between a sender clock and a receiver clock; transmission "cells" of pre-defined sizes; operation at a basic frame rate, with all transmissions being at integer multiples or devisors of the frame rate; and addressing carried out in a fixed size header (that is not by time, frame position or other fixed characteristic). ATM communication is sometimes also referred to as asynchronous time division (ATD) communications.

Attention has turned to the use of ATM for wireless or radio communications. There is, for example, a need for wireless users to have access to wired ATM networks and existing ATM systems such as multi-media applications need a wireless platform providing multi-media support. It is also recognized that systems such as universal mobile telephone systems (UMTS) and wireless local area networks (LANs) cannot meet all future data user needs. Efforts to date have been in the use of ATM in the wireless extension of fixed infrastructure systems, such as LANs and integrated service data network (ISDN).

U.S. patent application Ser. No. 08/641797, filed on 2 May 1996 and assigned to the assignee of the present invention describes a radio unit, a method of communicating between radio units over a communications channel and method of preparing a sequence of ATM cells for transmission over a radio channel and is incorporated herein by reference. In that patent application it is described how a channel can be considered as divided into frames and the start and end of a frame need not be synchronized across the system, provided that each two communicating units operate to the same frame length. Access by a radio unit to a frame location is described as implying access to the corresponding locations of subsequent frames. It is also described that some services may require a fractional number of cells per frame. While such an arrangement has the ability to provide much more efficient channel usage, efficiency may not be achieved if the manner of allocation of the available frame resources is not also efficient.

U.S. patent application Ser. No. 08/641797 describes an etiquette (referred to as "SAMA") based on the use of ATM style packets over the air. An etiquette can be considered to be a set of rules, agreed upon by all participants, that provide a group of individuals the ability to cooperate in an activity without the requirement for mutual communication. A protocol differs from an etiquette in one important aspect; the devices participating in a protocol must be capable of mutual communication.

There is a need for a communications system that provides a simple bandwidth setup mechanism; supports devices with widely varying bit rates; reduces the number of "collisions" and support the development of both ad-hoc and centrally controlled protocols.

A goal in the development of an ATM etiquette is the simplification of procedures for gaining access to the channel. In more traditional systems, this can takes several hundred of milliseconds and consume considerable bandwidth. In SAMA, access to the channel is gained by sending a "probe cell" in the desired frame slot and receiving an acknowledgment (ACK) in the corresponding slot of the next frame. The time taken by this exchange is, of course, a function of frame size, but will typically be less that fifteen milliseconds.

Figure 1:
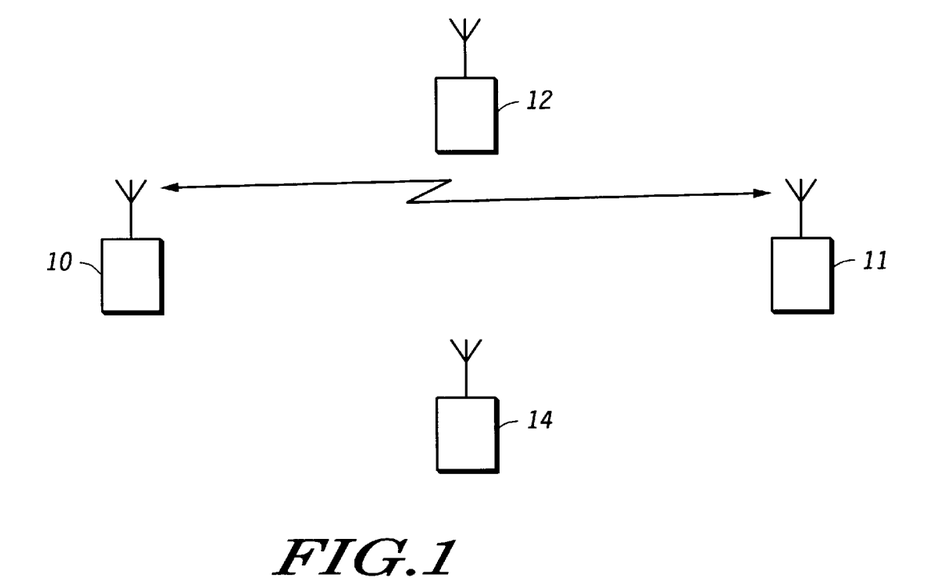
FIG. 1 is a geographical map representation of communications units communicating over a communications system.

Referring to FIG. 1, if a subscriber unit 10 sends a probe packet to a subscriber unit 14 in a slot that is in use by another pair of subscriber units 11 and 12, a collision occurs. The collision is confined to one data packet and has three possible outcomes: (i) the packet destined for subscriber unit 11 is destroyed and the packet destined for subscriber unit 14 succeeds; (ii) the packet destined for subscriber unit 14 is destroyed and the packet destined for subscriber unit 11 succeeds; (iii) both packets are destroyed.

There is a need for an efficient method of allocating frame locations in a wireless ATM communications system and minimizing collisions.

A preferred embodiment of the invention is now described, by way of example only, with reference to the drawings.

| Glossary of Terms | |
|---|---|
| ATM | Asynchronous transfer mode; |
| LAN | Local area network |
| RSSI | Received signal strength indication; |
| SAMA | "Simple" ATM Multiple Access; |
| VCI | Virtual circuit identifier; |
| VPI | Virtual path identifier. |

BRIEF DESCRIPTION OF THE DRAWINGS

FIG. 7 is a diagram of the matrix of FIG. 3 in accordance with a second specific embodiment of the invention.

FIG. 8 is a diagram of the matrix of FIG. 3 in accordance with a third specific embodiment of the invention incorporating features from the first and second specific embodiments.

DETAILED DESCRIPTION OF THE DRAWINGS

In the ATM communication system of the preferred embodiment of the invention, it is assumed that a basic channel will carry video, speech and data transmissions, all by ATM cells (packets) carrying a "payload" of 53 octets. All transmissions are generally asynchronous (do not require synchronization between the clock of a sender and the clock of a receiver) and are conducted through cells of a fixed size. All communications units are aware of a common frame length, or a frame length is established between two or more communicating units. A frame is divided into a fixed number of frame locations or "slots". Addressing is carried out in a fixed-size header, that is not by time, frame location or other fixed characteristic. Each wireless ATM cell includes a sequence number and an error detecting code. Cell generation rates may be negotiated and are in general variable.

In the example which will be described, each slot is 20.48 microseconds in duration, capable of carrying 512 bits at 25 Mbps. One ATM cell preferably comprises 424 bits of user payload and 48 bits of radio overhead (472 bits total). Therefore one slot additionally has time equivalent to 40 bits for round trip propagation delay (240 meters between users). There are 6 cells per frame, so a frame length is 122.8 microseconds. These figures are mere examples and the data rate, the cell length and the number of cells per frame can be selected differently.

Access by a radio unit to a frame location (slot) implies access to the corresponding locations or every Nth corresponding location of subsequent frames. After the location has been chosen, using an algorithm described below, the radio unit listens for an acknowledgment. The transmitting radio unit uses the same frame location in the next frame when the acknowledgment is received or abandons the frame location for which the acknowledgment was not received. These locations, which may be referred to as inaccessible locations, are not accessed again for at least a predetermined time-out period, for example 30 frames.

The cells are preferably all of equal length across the system, but this is not essential, provided at least that they are of fixed size (equal length) for the duration of a communication established between two units.

The physical medium for the communication is a radio channel, of which the frequencies, bandwidth, modulation and other aspects are entirely selectable for the circumstances and the spectrum available.

Figure 2:
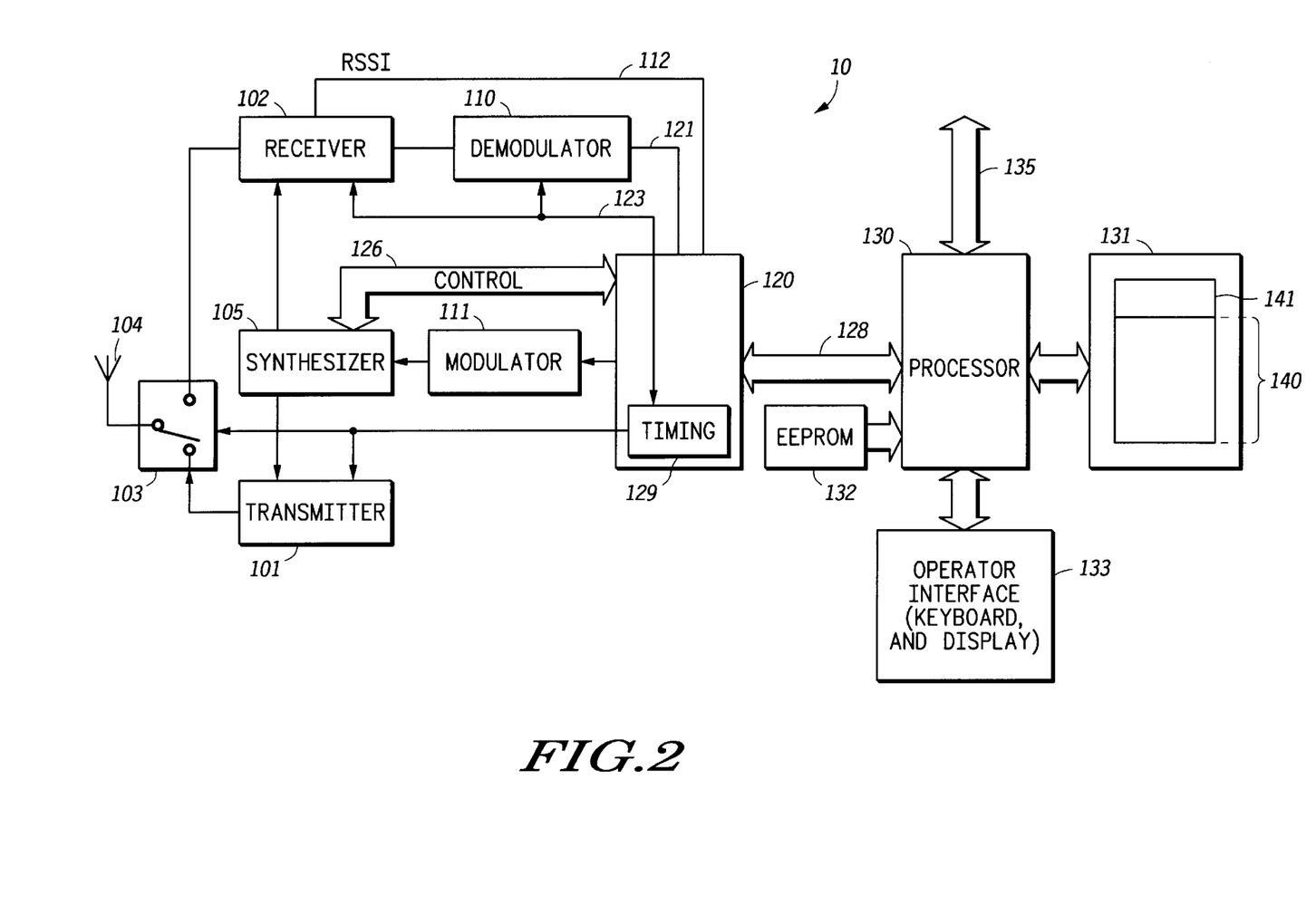
FIG. 2 is a block diagram of a radio unit operating in accordance with the present invention.

Referring now to FIG. 2, elements of an example of a radio unit in accordance with the present invention are shown. The construction and operation of other radio units 11, 12 and 13 such as are illustrated in FIG. 1 are identical and need not be described separately.

The radio unit 10 comprises a transmitter 101 and a receiver 102, both coupled to an antenna switch 103 and, through the antenna switch, to an antenna 104. A synthesizer 105 is coupled to each of the receiver 102 and the transmitter 101. A demodulator 110 is coupled to receiver 102. A modulator 111 is coupled to the synthesizer 105. A logic unit 120 is coupled via data lines 121 and 122 to the demodulator 110 and modulator 111, respectively, and is coupled by control lines 123 and 124 to the demodulator 110 and the receiver 102 and to the transmitter 101 and the antenna switch 103 respectively. A received signal strength indication (RSSI) line 112 passes from the receiver 102 to the logic unit 120, but this is optional. A control bus 126 is coupled between the logic unit 120 and the synthesizer 105. Logic unit 120 is shown as comprising a timing circuit 129. It may also comprise an error decoding circuit, an error coding circuit, an error detect circuit, and an error check generating circuit and other functions, or these functions can be performed in processor 130.

Coupled to the logic unit 120 via a digital bus 128 is a processor 130. Coupled to the processor 130 is a random access memory (RAM) 131, a program memory in the form of electrically erasable programmable read-only memory (EPROM) 132, an operator interface 133 such as a keyboard and display and an I/O interface 135.

The RAM 131 has a first memory space 140 for storing a matrix described below and a second memory space for storing numbers associated with cell locations in a frame, also described below.

In transmit operation, the processor 130 generates ATM cells (or receives these from the interface 135). Each ATM cell comprises a payload and a header. The processor 130 adds a SAMA field and supplies the resultant data to logic unit 120. In logic unit 120, timing circuit 129 adds a synchronization word to each cell and controls the timing of outputting of the resultant transmission burst data to the modulator 111.

It will, of course, be appreciated that alternative arrangements can be provided. For example, ATM layer and higher layer processing can be performed by the logic unit 120 or by the processor 130.

The logic unit 120 passes the data of each resultant transmission burst to the modulator 111 bit-by-bit and provides a transmitter key-up signal on control line 124 (at the same time switching antenna switch 103 to the lower position as shown). The timing circuit 129 controls the timing of key-up of the transmitter 101, so that each transmission burst is transmitted at a carefully selected time (slot) in a frame, as is described below.

When the transmitter 101 is not keyed up for transmission, the control line 124 causes the antenna switch 103 to switch to the upper position as shown, allowing ATM cells to be received via the antenna 104 to the receiver 102 and demodulated by the demodulator 110 and passed to the logic unit 120.

Timing circuit 129 derives bit timing from a received synchronization word at the start of each cell. Each received and verified ATM cell is identified by a virtual circuit identifier (VCI) in a header of the cell (described below). Cells received with the appropriate virtual circuit identifier are selected by the logic unit 120 for passing to the processor 130 for end-to-end communication and in addition, cells with other VCIs are passed to processor 130 for the purposes of building a matrix in memory space 140, as is described below.

The processor 130 orders received ATM cells in the correct order as defined by sequence numbers in a cell field (described below). The processor 130 assembles the cell payloads for passing on to upper layers of the protocol, for presentation at the operator interface 133 or for outputting at the interface 135.

Instead of an antenna switch 103, a duplexer can be used, allowing simultaneous receiving and transmitting of ATM cells. Logic unit 120 controls synthesizer 105 via control bus 126 to select appropriate frequencies for transmission and reception depending on the particular frequencies of the system and the modulation scheme and other aspects of the physical layer.

An important aspect of a communications system is quality of service. One measure of quality of service is probability of successful access. Certain measures can be taken to increase the probability that a subscriber device will be able to acquire the needed bandwidth on successive attempts. One of these measures is to treat the channel as a matrix of user activity. Users then acquire bandwidth by accessing matrix columns, as opposed to rows. The exact dimensions of such a matrix can be derived from the following principles: (i) the highest probability of collision occurs when a subscriber device initially accesses the channel to start a burst, so the highest routinely supported bandwidth should require only a single channel access; and (ii) the responsiveness of a device is limited by the amount of time it must to listen to the channel to detect the lowest bandwidth user, so the lowest bandwidth supported should be set sufficiently high as to minimize listening time.

Figure 3:
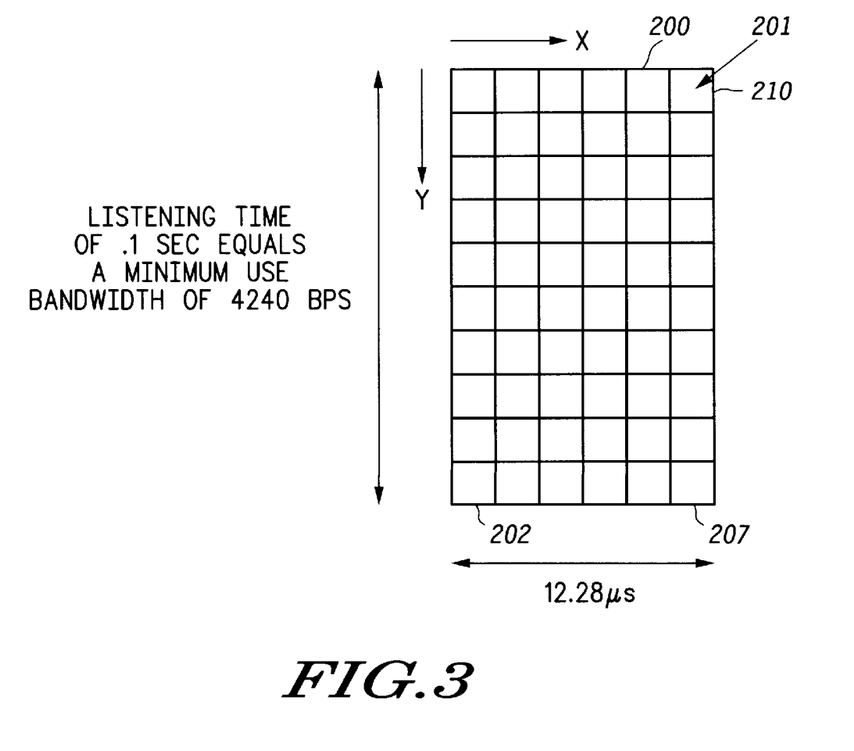
FIG. 3 is a diagram of a matrix maintained in memory in the radio unit of FIG. 2.

FIG. 3, shows an example of matrix dimensioning based on the above criteria. A matrix 200 of locations 201 (otherwise referred to as "slots") comprises six columns 202–207 and a number of rows such as row 210. The rows are shown as extending in a first dimension X and the columns are shown as extending in a second dimension Y. The matrix can be considered as a multiframe structure.

There are as many rows 210 as are necessary or available to achieve certain objectives. The number of rows dictates the size of the multiframe. If the minimum data rate is considered to be one slot per multiframe, the number of rows dictates the minimum data rate. The number of rows is generally constrained, however, by the maximum tolerable listening time. As an example, a preferred embodiment provides 120 rows, giving a total matrix duration of 120× 122.8 $\mu$s=14736 $\mu$s. An alternative embodiment sets a maximum listening time of 100 milliseconds, giving 814 rows in the matrix, resulting in a minimum data rate of $(25 \times 10^6/814 \times 6).(424/512)=4240$ bps, which is the data rate supported by one slot in one column.

The matrix 200 is stored in memory 140 of RAM 131. Upon start-up of the radio unit 10, or upon initiating of a transmission at the operator interface 133, receiver 102 begins to receive cells from the radio channel, passing these to the demodulator 110 and to the logic unit 120. The logic unit 120 passes the cells one-by-one to the processor 130, together with timing information from timing circuitry 129 and the processor 130 inserts indicators into the locations 201 of the matrix 200 corresponding to locations in a frame and in successive frames at which cells are detected. The process is continued until sufficient time has passed to complete a single matrix 200.

Figure 4:
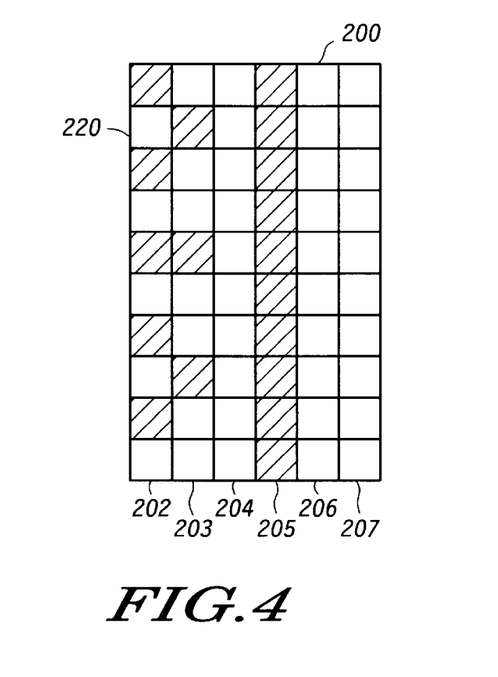
FIG. 4 is a diagram of the matrix of FIG. 3 for illustration of general principles of the invention.

When a single matrix has been filled with indicators, a typical result is shown in FIG. 4. In this example, each alternative row of column 202 contains an indicator indicating that the location is occupied. Each third row in column 203 contains such an indicator. There are no indicators in column 204, nor in columns 206 and 207, while indicators in column 205 occupy every row of that column, indicating that the complete column is occupied. An algorithm is now performed by processor 130 to interpret the contents of the matrix of FIG. 4.

In its simplest form, the algorithm has no information available as to the contents of the cells giving rise to the indicators shown in FIG. 4. In this embodiment, the indicators stored in column 202 can indicate either that there is an on-going channel set up between two communicating units occupying one-half of the bandwidth of that column, or it can indicate that there are two or more simultaneously communicating units utilizing the same frame position, but utilizing every second, third, fourth, etc. frame. Similarly, the indicators in column 203 can be interpreted to indicate that there is a single on-going communication occupying one-third of the available bandwidth of that column, or that there are more than one such communications, for example occupying one-sixth of the bandwidth. Similarly, the indicators in column 205 may indicate that there is a single communication on-going occupying one-sixth of the total channel bandwidth. Such a channel provides a user data rate of 4.17 Mbps, which is sufficient to carry superior quality video.

Based upon the available information, the algorithm performed by processor 130 operates to select a frame location and data rate to meet the needs of desired communication of the radio unit 10. Thus, if radio unit 10 wishes to establish a high quality video channel, it determines that an entire column is required and that column 204, 206 or 207 should be used. Radio unit 10 then probes for the desired channel in a manner described in U.S. patent application Ser. No. 08/641797, which is incorporated herein by reference. and upon success of the probing, the unit establishes communication over that channel. If, on the other hand, the desired communication requires a lower bandwidth, for example, voice communication, the algorithm performed by processor 130 operates to select an available location and a repeat rate for optimized packing. Optimized packing means that the selected location and repeat rate are such as not only to avoid collisions with other on-going communications, but also to provide greatest flexibility for future units wishing to establish new communications. Providing greatest flexibility includes avoiding, as far as possible, breaking up contiguous available locations.

Thus, for example, a new communication requiring one cell every second frame would select location 220 in FIG. 4 and alternate subsequent locations in column 202. This selection would be preferable to selecting location in column 204 or 206 or 207, as to do so would restrict the use of those columns for high data rate users. Similarly, a communication requiring one cell every third frame would chose column 203 (i.e. the second location in the frame). Moreover, a communication requiring one cell every Nth frame would select column 202 if N is a multiple of 2 and would select 203 if N is a multiple of 3. If N is not a multiple 2 or 3 (for example, N=5 or N=7), the algorithm would not choose column 202 or column 203, as to do so would result in collisions. In summary the algorithm identifies repeating patterns in the matrix and selects locations for new communications dependent on repeating patterns identified.

Two modifications of the above-described basic algorithm are now described. The first modification involves establishing an etiquette in which each column of the matrix is assigned a number, stored in memory location 141. The number assigned to each column is preferably a prime number. It is not necessary that each column has a different number assigned to it, but it is preferable that a selection of different prime numbers are allocated to different columns. Thus, as an example, the numbers 1, 2, 3, 5, 7, and 11 are assigned to the six columns respectively. This is illustrated in FIG. 5.

Figure 5:
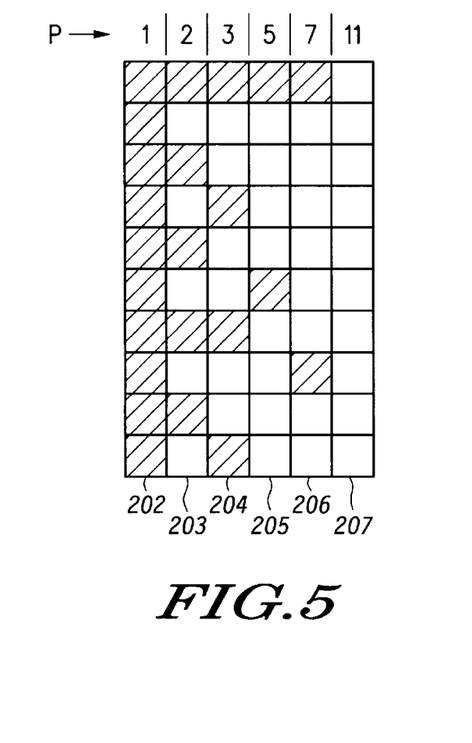
FIGS. 5 and 6 are diagrams of the matrix of FIG. 3 in accordance with a first specific embodiment of the invention.

In FIG. 5, the matrix 200 is illustrated with five on-going communications, taking place over different locations in a frame. In the example illustrated, the entire first column (column 202) is occupied by an on-going communication. The second column (column 203) is supporting a single on-going communication occupying every second frame location. In column 204, there is a single on-going communication occupying every third location, etc. for every Nth location in columns 205 and 206, where N is the prime number assigned to the column.

By establishing an etiquette wherein each of the radio units 10 to 14 understands that there is a minimum repeat number (P) corresponding to each position in a frame, and by operating to the etiquette that no unit repeats its communication at a rate greater than the minimum repeat number P and further that no unit repeats its communication at any rate other than a multiple of the minimum repeat number P, an etiquette is established in which the unit can listen to the channel, build up a matrix of known location occupancies and can determine an optimum packing position for establishment of a new communication, dependent only on the desired data rate for the new communication.

Thus, to establish a new communication, a desired data rate is chosen, a repeat rate is selected necessary to establish the desired data rate and a frame location is chosen corresponding to the highest minimum repeat number P that is a factor of the desired repeat rate. Thus, if the desired repeat rate is 6 (i.e. 1 slot in 6), column 204 is chosen, because the value P for column 204 is 3, which is the highest factor divisible into the desired repeat rate. Such a newly established communication will not occupy every third location in column 204, but will occupy every sixth location. This is illustrated in FIG. 6.

Figure 6:
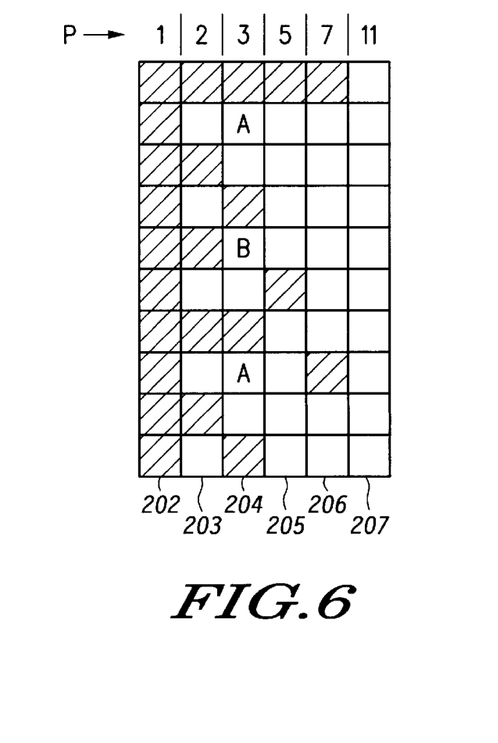

In FIG. 6, a new communication is established vis-a-vis the arrangement shown in FIG. 5, in which channel A is established using every sixth cell in column 204. Should another unit, e.g. unit 12, wish to establish another channel using every sixth cell, the optimum packing position for this new channel is position B. Channels A and B can peacefully co-exist in the same frame location, because they are only using a fraction of the available bandwidth in that frame location, they are occupying only every sixth cell location and their repeat numbers are the same multiple of the minimum repeat number P for the column that they occupy (i.e. they can alternatively occupy every third location in column 204).

In this manner, the matrix in FIG. 6 is built up and is continuously updated. When an on-going session is terminated, the corresponding locations in the matrix will be vacated and this information is updated in the matrix.

In fact, to support a voice channel, as little as 32 Kbps is necessary, equating to 1 slot in every 120 slots. This is a reasonable minimum channel occupancy. If a device requires a data rate less than 32 Kbps, it is preferable that another system altogether is selected, so as not to congest the system described.

A situation can readily be envisaged where a number of separate communications take place in a single location at data rates as low as 32 Kbps or 64 Kbps, occupying, respectively, one slot in every 120 slots or every 60 slots. For example, 60 separate communications could take place in column 205, each occupying only one 1⁄60 of the available bandwidth represented by that column.

Similarly, a situation can be envisaged where the required repeat rate is a number divisible by 7, but where column 206 is entirely occupied. A unit requiring a repeat rate divisible by 7 would have to select a different repeat rate, for example 5 or 11, and seek a suitable location in column 205 or column 207. This may be less efficient or may be slower than desired, but would overcome the temporary problem of column 206 being fully occupied. Many other packing rules can be devised to achieve optimum packing in any given situation.

Thus, a method has been described of communicating by transferring cells between a first radio unit and a second radio unit over a communication channel having repeating frames. The method comprises: maintaining a matrix of frame positions, where a first dimension of the matrix corresponds to positions in a frame and a second dimension corresponds to frames in a sequence of frames; associating with each frame positions a value representative of a minimum repeat number (P); providing a cell allocation to a position in a frame; and repeating the cell allocation every Nth frame where N is an integer multiple of the repeat number (P).

Referring now to FIG. 7, an alternative embodiment of the invention is illustrated, in which a protocol is established, instead of the etiquette described with reference to FIGS. 5 and 6. In this protocol, each cell (or at least periodic cells) include within a header in the cell an indicator representing an integer value N, where N is the repeat rate of the communication represented by the cell. Thus, if N equals 1, this indicates that the repeat rate is 1 and the cell occupies the same position in every frame. If the number if 3, this indicates that the channel represented by the cell occupies one-third of the available bandwidth of the frame position, that is to say it repeats every three frames. In FIG. 7, other examples are given where N equals 27 and N equals 60. Thus, for example, in column 204, there are two separate communications on-going, each having a repeat rate N equals 60.

When a device comes on-line, it listens to determine if a network is currently active. If the device detects a network, it begins to create a matrix map. It is interesting to note that it does not matter which of the "virtual columns" that the device designates as column one, the access patterns will appear the same, only shifted left or right.

The devices are capable of mutual communications, so that a protocol is possible. This leads to the introduction of an additional mechanism to further increase channel efficiency. Each device can include, as part of the packet header, an indication N of the exact bandwidth it is using, such as:

1⁄1—indicates one packet per frame; or

1⁄3—indicates one packet every three frames.

A cell is received by receiver 102, demodulated by demodulator 110 and decoded either by logic unit 120 or by processor 130 and the repeat number N is extracted from the header in the cell. This repeat number is then inserted in the appropriate place in the matrix.

With this additional information, it is now possible to ascertain with greater precision where collisions will occur if certain cells are taken up or occupied. Thus, for example, it is known that the occupancy of location 301 will not repeat for a further 26 rows. It is therefore safe to occupy any location in column 203, provided that the repeating occurrence of communication represented by location 302 is avoided (which repeats every three frames) and provided that the 27th frame following location 301 is also avoided. This leaves room in column 203 for many other communications having a repeat rate N=27. Without the knowledge of the actual repeat rate, it is not safe to assume a particular repeat rate.

In FIG. 7, there are shaded locations, e.g. location 304, representing locations where cells are detected, but not decoded. This may occur, for example, where there is a collision between two cells, resulting in undecodable energy occurring at the indicated location. The undecoded cell may also represent cells from units operating on the system and operating to the same frame structure, but not operating according to the protocol. If a repeat pattern can be discerned from such cells, this can be used in determining the optimum packing for a new channel. Otherwise, such cells are avoided where possible or a probing attempt can be made in spite of the apparent occupancy of those locations.

Thus a further method has been described comprising: maintaining a matrix of cell positions, where a first dimension of the matrix corresponds to positions in a frame and a second dimension corresponds to frames in a sequence of frames; selecting from the matrix a position in a frame; transmitting a cell at the selected position in the frame and including in the transmitted cell an indicator, where the indicator represents an integer value N; and transmitting subsequent cells at the selected position every Nth frame. A corresponding method has been described comprising: receiving a cell from the second unit at an identified position in a frame; extracting an indicator from the received cell, where the indicator represents an integer value N; and recording in the matrix an indication of occupancy of the identified position in the first dimension in every Nth frame in the second dimension.

Referring to FIG. 8, a third embodiment of the invention illustrated combining the etiquette described with reference to FIGS. 5 and 6 and the protocol described with reference to FIG. 7. In this example, the numbers P allocated to the respective columns are: 1, 1, 3, 3, 5 and 5. In this example, units wishing to transmit select the column (i.e. frame location) for which the value P is a factor of the repeat rate value N and is the largest factor of the repeat rate. Thus, a communication with a repeat rate N=27 selects the third column, for which P=3 while a communication with a repeat rate N=60 selects the fifth column for which P=5. In this arrangement, cells contain a repeat value N within a header.

This arrangement differs from the arrangement described in FIG. 7, in that where there is no current activity in a particular frame location, there remains a set of etiquette rules determining whether that frame location can be occupied. The rule is that the frame location is not occupied if there is a frame location having a repeat value P which is a factor of the desired repeat rate N and which is higher than the repeat value P for the frame location in question. Thus, a new communication having a repeat rate N=60 will select the fifth frame location (P=5) in preference to the second, third or fourth frame location (P=1, P=3 and P=3 respectively).

Figure 9:
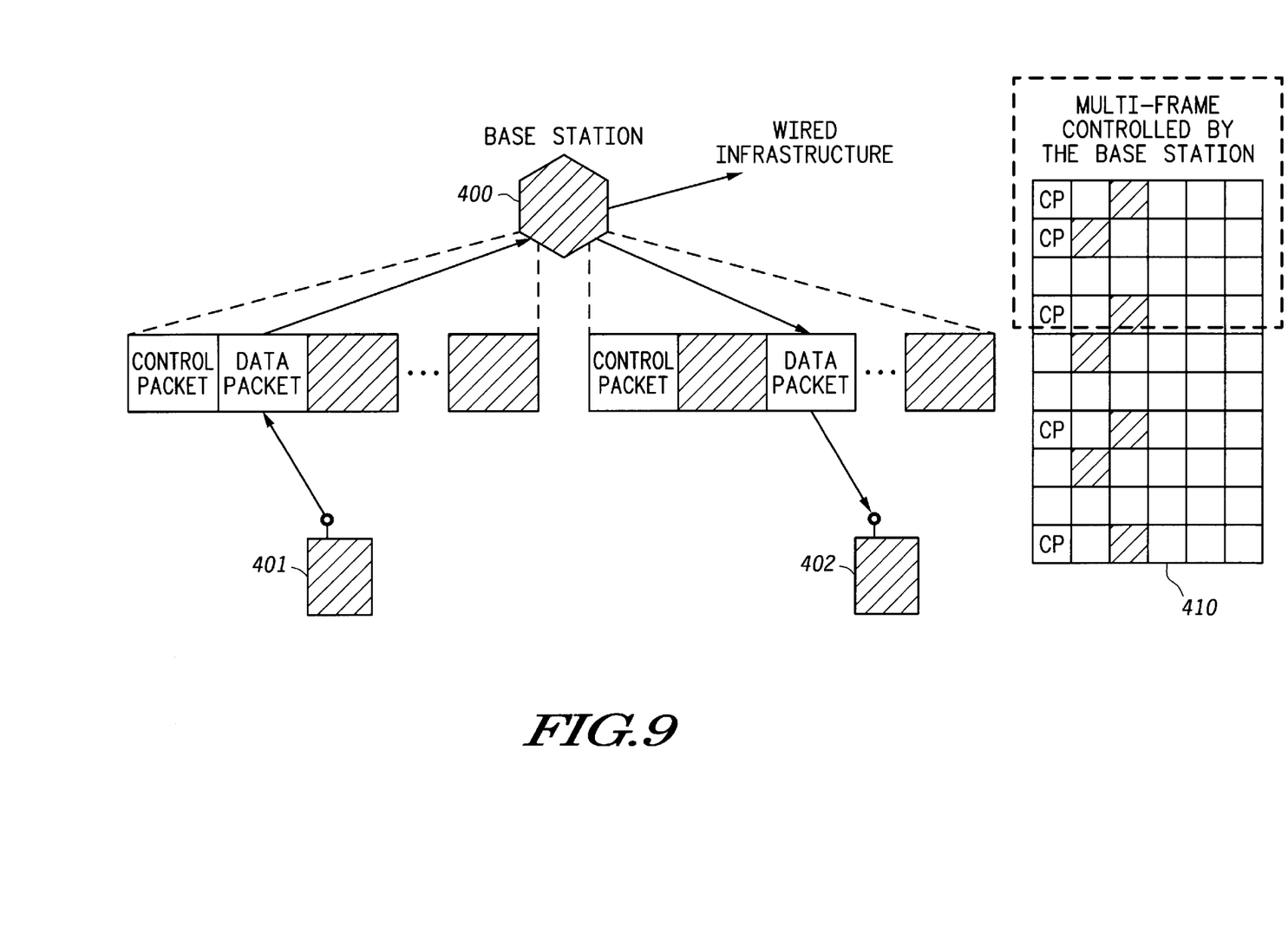
FIG. 9 is a block diagram of a centralized communications system in accordance with the present invention and includes a corresponding matrix diagram.

To use a SAMA matrix as a centrally controlled protocol, it is a simple matter to have a base station radio designate one packet as the control packet. This packet will contain channel access grants controlling access to multiple "virtual frames". This is illustrated in FIG. 9 which shows a base station 400 controlling communications between two remote units 401 and 402 and shows a corresponding matrix map 410.

The combination of quantizing bandwidth into fixed size packets and accessing the matrix in columns produces a discernible pattern that can be associated with each type of service. The ability to discern a pattern allows devices to seek out columns that are occupied by synergistic patterns, thus reducing the probability of collisions. An additional important benefit resulting from this methodology is a form of dynamic channel sub-banding without the need for explicit channelization.

It will be understood that the above description has been given by way of example only and that modifications of detail can be made within the scope and spirit of the invention.

We claim:

1. A method of communicating by transferring cells between a first radio unit and a second radio unit over a communication channel having repeating frames, comprising:

maintaining, at the first radio unit, a matrix of frame positions, where a first dimension of the matrix corresponds to positions in a frame and a second dimension corresponds to frames in a sequence of frames;

associating with each frame position a value representative of a repeat number (P);

providing a cell allocation to a position in a frame and repeating the cell allocation every Nth frame where N is an integer multiple of the repeat number (P), and transferring cells to the second radio unit according to the cell allocation.

2. A method of communicating by transferring cells between a first radio unit and a second radio unit over a communication channel having repeating frames, comprising:

maintaining a matrix of cell positions, where a first dimension of the matrix corresponds to positions in a frame and a second dimension corresponds to frames in a sequence of frames;

selecting from the matrix a selected position in the frame;

transmitting a cell at the selected position in the frame and including in the cell an indicator, where the indicator represents an integer value N; and transmitting subsequent cells at the selected position every Nth frame.

3. A method of communicating by transferring cells between a first radio unit and a second radio unit over a communication channel having repeating frames, comprising, at the first radio unit:

maintaining a matrix of cell positions, where a first dimension of the matrix corresponds to positions in a frame and a second dimension corresponds to frames in a sequence of frames;

receiving a received cell from the second radio unit at an identified position in the frame;

extracting an indicator from the received cell, where the indicator represents an integer value N; and recording in the matrix an indication of occupancy of the identified position in the first dimension in every Nth frame in the second dimension.

4. A radio unit for communication over a communication channel having repeating frames, comprising:

a first memory location having stored therein a matrix of cell positions, where a first dimension of the matrix corresponds to positions in a frame and a second dimension corresponds to frames in a sequence of frames;

a second memory location having stored therein a value corresponding to each position in the frame of the first dimension of the matrix, the value being representative of a repeat number (P);

a processor coupled to the first memory location, and the second memory location;

timing circuitry coupled to the processor, responsive to contents of the first memory location and the second memory location; and a transmitter coupled to the timing circuitry and responsive to the timing circuitry for transmission of cells at times governed by the contents of the first memory location and the second memory location.

5. A radio unit for communication over a communication channel having repeating frames, comprising:

a first memory location having stored therein a matrix of cell locations, where a first dimension of the matrix corresponds to locations in a frame and a second dimension corresponds to frames in a sequence of frames;

a second memory location having stored therein a value corresponding to each location in the frame of the first dimension of the matrix, the value being representative of a repeat number (P);

a receiver; and a processor coupled to the first memory location, the second memory location and the receiver, responsive to receipt of a value N by the receiver to insert the value N into the matrix.

6. The radio unit of claim 5, wherein the processor is coupled to the first memory location for selecting a first cell position in a frame from the table and for selecting the same cell position in every Nth subsequent frame, where N is an integer multiple of the repeat number (P) for the first cell position.

* * * * *